Jan. 3, 1967  W. DIETRICH  3,295,914
HITCH GUIDE MIRROR FOR MOUNTING ON A TRAILER JACK HOUSING
Filed Jan. 3, 1964
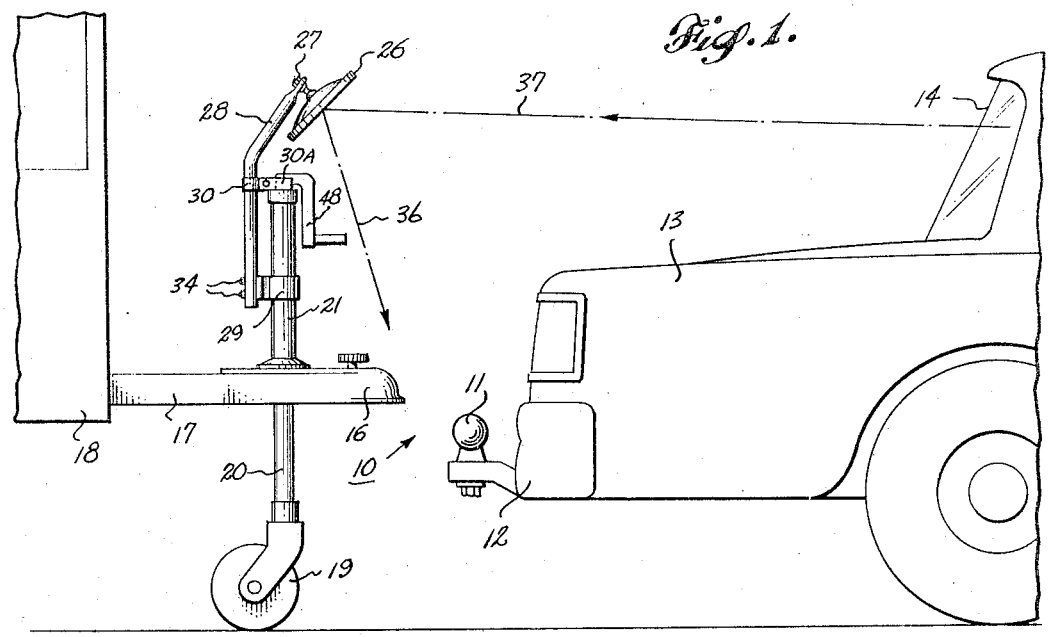
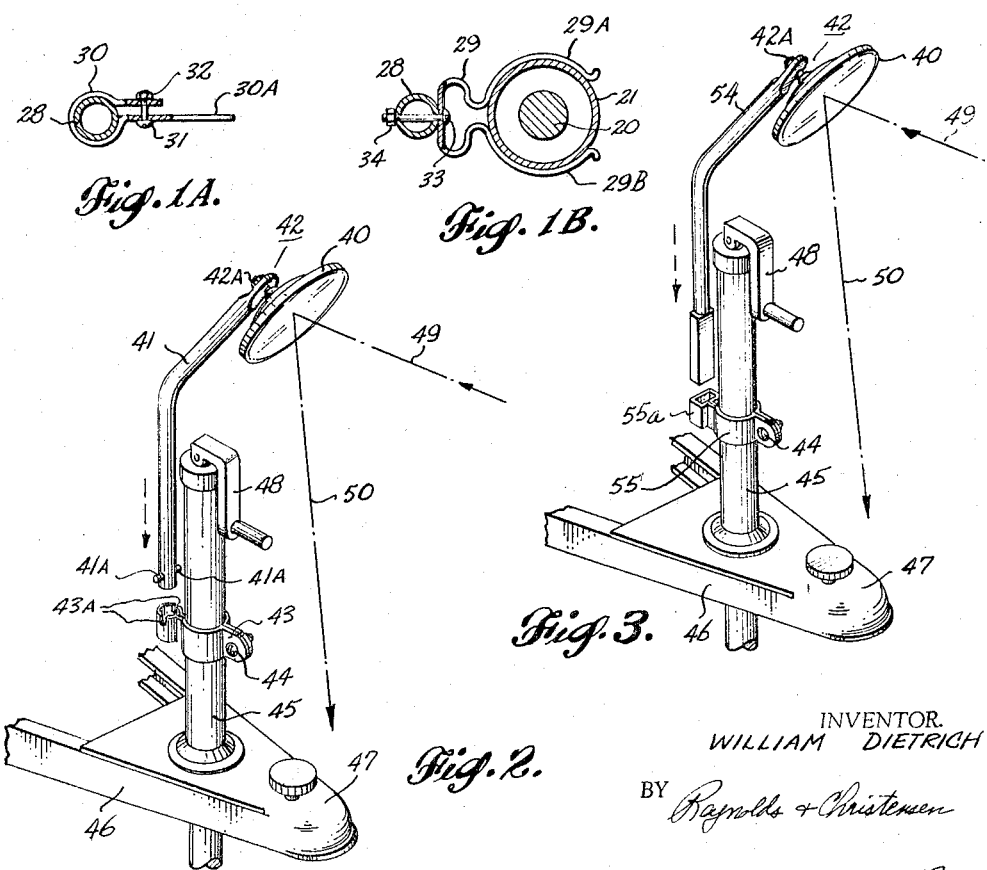
INVENTOR.
WILLIAM DIETRICH
BY Reynolds + Christensen
ATTORNEYS

3,295,914
HITCH GUIDE MIRROR FOR MOUNTING ON A TRAILER JACK HOUSING
William Dietrich, 3611 E. 112th St.,
Takoma, Wash. 98446
Filed Jan. 3, 1964, Ser. No. 335,487
2 Claims. (Cl. 350—307)

The present invention relates to an improved trailer hitch guide mirror for facilitating the positioning of a tow vehicle in proper alignment with the towbar of a trailer during coupling of the vehicle to the trailer.

Various types of coupling devices commonly referred to as trailer hitches are presently used for connecting a trailer or similar wheeled vehicle to a tow vehicle such as a car or truck. The trailer-to-tow vehicle coupling assembly generally includes a first member rigidly secured to the towbar or tongue of the trailer and a second member rigidly secured to the bumper or the frame of the tow vehicle. Since the coupling assembly is located near the lower rear portion of the tow vehicle it is generally impossible for the driver of the vehicle to observe the coupling assembly when the two members thereof are interconnected. While the inability to observe the assembly once the trailer is coupled with the car or truck is of no disadvantage, it is a distinct disadvantage during the actual coupling operation. The driver can normally observe the coupling member on the trailer towbar as he starts to back the car or truck into position and when still a considerable distance away from the trailer. Thus the two coupling members can be brought into approximate alignment. However as the tow vehicle approaches the trailer the driver's view of the coupling assembly becomes obsecured by the rear portion of the car or truck and therefore during the final positioning of the tow vehicle the driver must guess at the position of the hitch assembly. This frequently leads to repeated trails necessitating repeated dismounting by the driver to observe the actual position of the two parts after each try. In those cases where the trailer is relatively light it might be possible for the driver to make the final connection by moving the trailer tongue by hand, but in those cases where the trailer is loaded or is of a heavy type such as the common house trailer it is impossible to make any adjustments by movement of the trailer. Therefore the only way to couple the trailer to the tow vehicle is to obtain exact alignment of the two parts of the coupling assembly by positioning the tow vehicle.

It is therefore an object of the present invention to provide an apparatus for aiding the driver of a tow vehicle in positioning the tow vehicle in accurate coupling alignment with the coupling apparatus connected to a trailer.

It is a further object of the present invention to provide an improved trailer coupling guide apparatus including a mirror connected to a trailer in a manner such that the driver of a tow vehicle can observe the trailer-to-tow vehicle coupling assembly during the final positioning of the tow vehicle.

It is another object of the present invention to provide a simplified and low cost mirror assembly adapted to be detachably mounted on a trailer in the immediate vicinity of the trailer hitch and in a manner such that a clear view of the area of the trailer hitch is provided to the driver of a tow vehicle as the tow vehicle is being positioned for connection to the trailer.

An additional object of the present invention is to provide a mirror assembly adapted for connection to a trailer to provide a view of the trailer hitch thereon to the driver of a tow vehicle and including adjustment means which facilitates easy removal and repositioning of the assembly on a given trailer in a manner such that readjustment of the assembly is not required as it is repeatedly removed and attached to the trailer.

In accordance with the teachings of the present invention an adjustable mirror is secured to a support and bracket assembly which is particularly adapted for attachment to a trailer in a position to provide to the driver of a tow vehicle a view of the trailer-to-vehicle coupling assembly. While the mirror may remain in position during travel it is of particular value to be able to readily remove it to avoid damage thereto. Thus a detachable bracket is provided to facilitate positioning and removal of the mirror from the trailer. The attachment means includes guide means and settable adjustment means so constructed that when the mirror is attached to the trailer the mirror is focused on the coupling assembly and is in proper adjustment to permit viewing of the coupling assembly and is in proper adjustment to permit viewing of the coupling assembly by the driver of a tow vehicle. The adjustments need only be set once for a given trailer and then thereafter when the driver attaches the mirror to the trailer he is assured that a proper view of the coupling assembly will be provided without further adjustments being required. In one embodiment of the invention a bracket adapted to receive the mirror and associated support arm is permanently secured to the trailer and is so constructed that when the mirror support arm is placed therein the mirror will be in proper position. In another embodiment of the invention the attaching bracket is permanently secured to the mirror support arm with a settable adjustment member being provided to insure proper positioning of the mirror with little or no effort on the part of the user.

The above and additional objects and advantages of the present invention will be more clearly understood from the following description when read with reference to the accompanying drawing wherein, FIGURE 1 is a right side view of a common type of trailer towbar having one preferred embodiment of the invention secured thereto and also including a portion of a tow vehicle having one member of the trailer coupling assembly secured thereto;

FIGURE 1A is a top view of the upper adjustable portion of the mirror support and attachment apparatus included in FIGURE 1;

FIGURE 1B is a top view of the lower attachment bracket included in FIGURE 1;

FIGURE 2 is an orthogonal view of another embodiment of the invention including a different type of mirror support assembly; and FIGURE 3 is an orthogonal view of an embodiment of the invention showing another preferred mirror attachment apparatus and the associated supporting portion of a trailer.

Referring now to drawings and in particular to FIGURE 1 there is shown for purpose of illustration a ball and socket type of trailer-to-tow vehicle coupling apparatus 10 which includes a steel ball member 11 secured to the rear bumper 12 of a tow vehicle 13 having a rear window 14. The tow vehicle is shown as an automobile merely for purpose of illustration and for teaching the present invention. The coupling assembly 10 also includes a steel socket member 16 attached to the towbar or tongue 17 of a trailer 18, said socket member being adapted for locking connection with the ball member 11 in a manner well known in the art. The trailer is illustrated as being of the conventional type which includes a front support assembly comprising a small wheel 19 carried at the lower end of a shaft 20 the upper end of which is disposed within a vertically extending trailer support jack housing 21 secured to the towbar 17. As is common in the art, the shaft 20 is adjustably disposed in the housing 21 to permit adjustment of the distance between the wheel 19 and towbar 17 and hence permit leveling of the trailer 18 and disconnection from the tow vehicle by elevation of the socket 16.

A light reflecting surface shown as a mirror 26 is adjustably secured at joint 27 to a support member illustrated as a bent rod 28 having a connecting bracket 29 and an adjustment clamp 30 secured thereto. As seen in FIGURE 1A the adjustment clamp 30 includes a protruding location surface 30A adapted for engagement with the top of the housing 21. A bolt 31 passes through the clamp 30 and has a lock nut 32 threaded thereon so that the clamp 30 can be locked in a selected position on the rod 28. As seen in FIGURES 1 and 1B the bracket 29 is bolted to rod 28 by a pair of bolts 33 and associated nuts 34. The bracket 29 is made of spring steel and includes resilient arms 29A and 29B adapted to encompass in a secure manner the housing 21.

The apparatus is used as follows. The bolt 31 is loosened and the bracket 29 is attached to the housing 21. The vertical location of the mirror 26 is established so that with the mirror 26 focused on the area of the socket 16 a clear line of sight is provided along paths 36 and 37 from the trailer coupling assembly to the driver of the vehicle 13. The clamp 30 is then positioned with its protruding portion 30A engageable with the top of the jack housing 21, at which time the bolt 31 is tightened to secure the clamp 30 against further movement on the rod 28. The joint 27 is of the adjustable locking type and therefore it will be seen that the mirror 26 is now properly positioned to provide to the driver an unobstructed view of the ball 11 and socket 16 as the vehicle 13 is being backed into position. The mirror 26 is preferably of a size to permit viewing of a substantial area surrounding the socket 16. While not necessary, it is convenient to make the above indicated initial adjustments with the ball and socket actually engaged to make certain that a clear line of sight is provided for the particular vehicle 13 being used. After the adjustments have been made the mirror, support member 28, bracket 29 and clamp 30 are removed from the trailer after the trailer has been coupled with the tow vehicle. This prevents damage to the mirror during travel. At a later time when the coupling operation is to be again performed the driver merely snaps the bracket 29 on the jack housing 21 with the adjustment clamp 30 engaged with the top of the housing 21. Without further adjustment a clear view of the coupling apparatus will be provided to the driver as the vehicle 13 is backed into position.

Referring now to FIGURE 2 there is shown an embodiment of the invention which includes a mirror 40 secured to a support arm 41 by means of an adjustable joint 42 which includes a locking nut 42A. It will be seen that the lower end of the support arm 41 is provided with a pair of diametrically opposed studs 41A which are adapted for positioning in the slots 43A in an adjustable clamp and receptacle bracket 43. The clamp and receptacle bracket 43 is provided with an adjustment bolt 44 which is tightened when the clamp and receptacle bracket 43 has been properly positioned on the jack housing 45. As in FIGURE 1, the jack housing is secured to the towbar 46 having a coupling socket 47. A crank 48 is provided for adjusting the elevation of the front end of the trailer and for retracting the front trailer support after the trailer has been attached to the tow vehicle. The apparatus of FIGURE 2 is adjusted in a manner similar to that set forth with respect to the embodiment of FIGURE 1 so that a driver is provided with a clear view along paths 49 and 50 of the area which includes the coupling apparatus during positioning of the tow vehicle. It will be seen in FIGURE 2 that when the clamp and receptacle bracket 43 has once been properly located to place the mirror in the correct position the bolt 44 is tightened. The clamp and receptacle bracket are then left on the trailer. Thereafter the arm 41 carrying the mirror 40 is merely inserted in the clamp and receptacle bracket and is held non-rotatable therein by the cooperation of studs 41A with the slots 43A. Accurate repositioning of the mirror is thus assured with a minimum of effort by the user.

In the embodiment of the invention shown in FIGURE 3 parts similar to those of FIGURE 2 are illustrated with similar parts bearing like reference numerals. In FIGURE 3, however, it will be seen that the lower portion of the mirror support member 54 has a rectangular cross section and is adapted to fit into a receptacle socket 55A which is closed on its bottom end and serves to properly position the mirror above and to the rear of the hitch assembly. The receptacle portion 55A is of rectangular cross section with the opening thereof providing a close fit for the lower rectangular end of the support member 54. The arrangement is similar to that of FIGURE 2 in that the arm 54 and mirror 40 carried thereby are removable from the trailer for protection during travel but are readily reattached to the trailer without the need for refocusing of the mirror.

There has been disclosed a novel apparatus for aiding the driver of a tow vehicle to accurately position the tow vehicle for coupling to a trailer without the need for assistance from another person and without requiring repeated attempts by the driver to place the vehicle in the exact position required. The mirror portion of the apparatus is easily removed from the trailer for protection with means being provided to minimize the time required for reattachment and alignment.

What is claimed is:

1. In combination with a trailer hitch assembly including tow vehicle coupling means and trailer vehicle coupling means having a vertically extending trailer support jack housing, a hitch assembly viewing apparatus detachably mounted on said trailer support jack housing and comprising a mirror,
   first support means attached to said mirror,
   clamp means attached to said trailer support jack housing and being movable with respect thereto to position said mirror at a predetermined height with respect to said trailer hitch assembly, and
   receptacle means supported by said clamp means and being adapted to receive a portion of said first support means and to position said first support means and said mirror at said predetermined height,
       said receptacle means being of a cross-sectional shape complementary to the cross-sectional shape of the portion of said first support means received therein and proportioned so as to prevent relative rotation therebetween when said first support means is seated in said receptacle means,
   whereby said mirror and said first support means may be inserted and removed from said receptacle means as desired to provide a pre-aligned viewing apparatus in the line of sight of a tow vehicle driver presenting an unobstructed view of the trailer hitch assembly during the operation of coupling the tow vehicle to the trailer vehicle.

2. In combination with a trailer hitch assembly including tow vehicle coupling means and trailer vehicle coupling means having a vertically extending trailer support jack housing, a hitch assembly viewing apparatus detachably mounted on said trailer support jack housing and comprising a mirror,
   first support means attached to said mirror,
   resilient clamp means attached to said first support means for coupling said first support means to said trailer support jack housing, and
   adjustable positioning means attached to said first support means and engageable with the top of said trailer support jack housing, whereby said adjustable positioning means may be mounted at a selected location on said first support means to serve as a limit stop to assure the correct height positioning of said mirror in the line of sight of a tow vehicle driver presenting an unobstructed view of the trailer hitch assembly during the operation of coupling the tow vehicle to the trailer vehicle.

References Cited by the Examiner

UNITED STATES PATENTS

| | | |
|---|---|---|
| D. 85,668 | 12/1931 | Schurmann. |
| 1,220,069 | 3/1917 | Capdevila. |
| 1,967,980 | 7/1934 | Talty. |
| 2,075,900 | 4/1937 | Jackson _____ 88—86 |
| 2,815,732 | 12/1957 | Majors. |
| 3,159,917 | 12/1964 | Whitehead _____ 33—46.1 |

FOREIGN PATENTS

| | | |
|---|---|---|
| 472,512 | 8/1914 | France. |
| 708,349 | 5/1954 | Great Britain. |
| 794,962 | 5/1958 | Great Britain. |

JEWELL H. PEDERSEN, *Primary Examiner.*

FREDERICK M. STRADER, *Examiner.*

T. L. HUDSON, O. B. CHEW, *Assistant Examiners.*